US009228068B2

(12) United States Patent
Ackermans et al.

(10) Patent No.: US 9,228,068 B2
(45) Date of Patent: Jan. 5, 2016

(54) INCREASED OUTPUT OF A FILM EXTRUSION PROCESS

(71) Applicant: Borealis AG, Vienna (AT)

(72) Inventors: Nina Ackermans, Tessenderlo (BE); Bert Broeders, Heusden (BE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/361,851

(22) PCT Filed: Nov. 28, 2012

(86) PCT No.: PCT/EP2012/073861
§ 371 (c)(1),
(2) Date: May 30, 2014

(87) PCT Pub. No.: WO2013/083461
PCT Pub. Date: Jun. 13, 2013

(65) Prior Publication Data
US 2014/0343230 A1 Nov. 20, 2014

(30) Foreign Application Priority Data
Dec. 5, 2011 (EP) .................................... 11191907

(51) Int. Cl.
| | |
|---|---|
| C08J 5/18 | (2006.01) |
| B29C 47/00 | (2006.01) |
| B29K 23/00 | (2006.01) |
| C08L 23/08 | (2006.01) |
| C08L 23/10 | (2006.01) |
| C08L 23/14 | (2006.01) |
| B29K 105/00 | (2006.01) |
| B29L 7/00 | (2006.01) |

(52) U.S. Cl.
CPC ............... *C08J 5/18* (2013.01); *B29C 47/0004* (2013.01); *B29C 47/0021* (2013.01); *B29C 47/0026* (2013.01); *B29K 2023/10* (2013.01); *B29K 2023/12* (2013.01); *B29K 2023/16* (2013.01); *B29K 2105/0085* (2013.01); *B29K 2105/0088* (2013.01); *B29K 2105/256* (2013.01); *B29K 2995/0053* (2013.01); *B29K 2995/0063* (2013.01); *B29L 2007/008* (2013.01); *C08J 2323/10* (2013.01); *C08J 2323/16* (2013.01); *C08J 2423/12* (2013.01); *C08L 23/08* (2013.01); *C08L 23/10* (2013.01); *C08L 23/142* (2013.01); *C08L 2205/02* (2013.01); *C08L 2205/025* (2013.01)

(58) Field of Classification Search
CPC ..... C08J 5/18; C08J 24/2312; B29C 47/0021; B29C 47/0004; B29C 47/0026; B29C 2007/008; C08L 23/08; C08L 23/10; C08L 23/142; C08L 2205/02; C08L 2205/025; B29K 2023/10; B29K 2105/0088; B29K 2023/12; B29K 2995/0053; B29K 2995/0063; B29K 2105/256
USPC ................................ 525/191, 240; 264/176.1
See application file for complete search history.

(56) References Cited

U.S. PATENT DOCUMENTS

| | | | | |
|---|---|---|---|---|
| 6,723,795 | B1 * | 4/2004 | Dupire et al. ................. | 525/240 |
| 7,491,770 | B2 * | 2/2009 | Autran et al. ................. | 525/191 |

FOREIGN PATENT DOCUMENTS

| | | |
|---|---|---|
| EP | 10204248 A1 | 4/1998 |
| EP | 0856555 A1 | 8/1998 |
| EP | 1923407 A1 | 5/2008 |
| EP | 2338930 A1 | 6/2011 |
| JP | 2004-520455 A | 7/2004 |
| JP | 2010-523792 A | 7/2010 |
| WO | 02/44272 A1 | 6/2002 |
| WO | 2004087419 A1 | 10/2004 |
| WO | 2010097409 A1 | 9/2010 |

OTHER PUBLICATIONS

First Japanese Office Action dated Jun. 1, 2015.
European Office Action dated Feb. 14, 2014.
Abdellah Ajji and Michel M. Dumoulin "Biaxially oriented polypropylene (BOPP) processes", Polypropylene, An A-Z reference, 1999.
Enichem Dutral, Ethylene-Propylene Elastomers.

* cited by examiner

*Primary Examiner* — Nathan M Nutter
(74) *Attorney, Agent, or Firm* — Tarolli, Sundheim, Covell, Tummino LLP

(57) ABSTRACT

The invention relates to a process for preparing polypropylene films, a polypropylene film obtained by such a process, use of said polypropylene film as packaging material, an article comprising said polypropylene film as well as to the use of a polypropylene composition to improve the processability of a film production process.

10 Claims, 1 Drawing Sheet

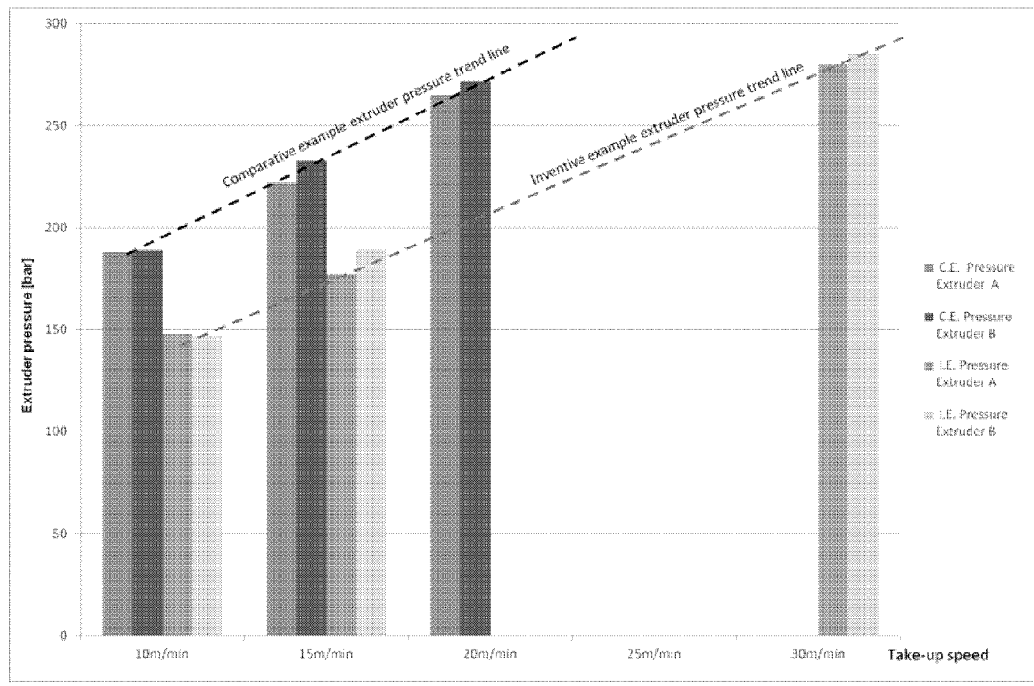
Figure 1: Extruder pressure in function of take-up speed
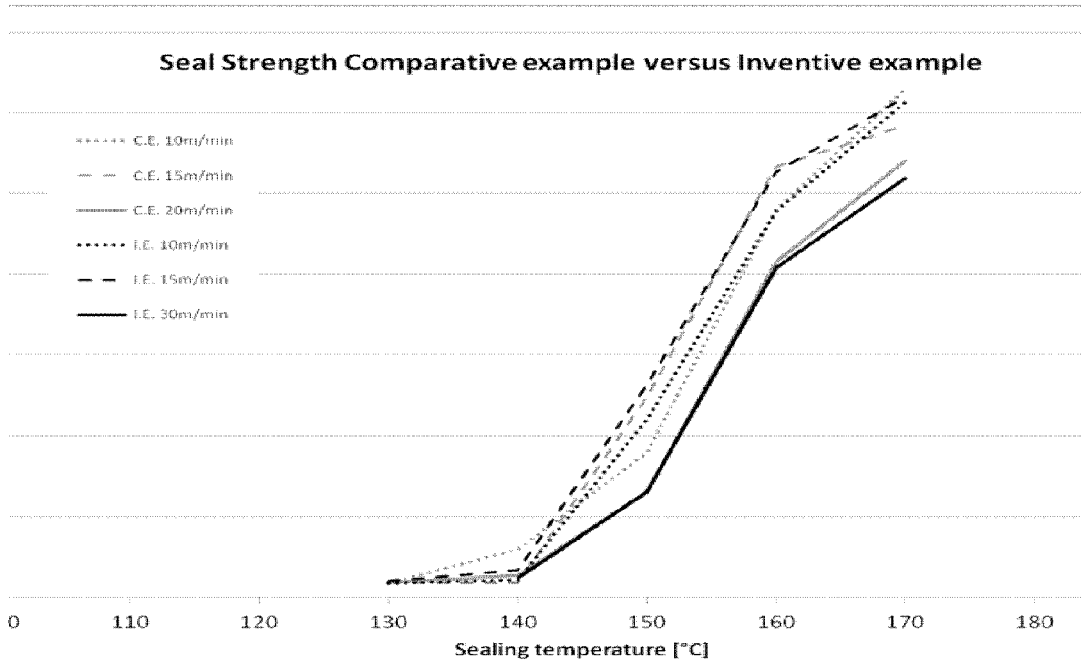
Figure 2: Seal strength in function of sealing temperature

INCREASED OUTPUT OF A FILM EXTRUSION PROCESS

The invention relates to a process for preparing polypropylene films, a polypropylene film obtained by such a process, use of said polypropylene film as packaging material, an article comprising said polypropylene film as well as to the use of a polypropylene composition to improve the processability of a film production process.

Today, polypropylene is the material of choice for many applications. For instance, polypropylene is widely used in areas where sealing properties play an important role, like in the food packaging area. Irrespectively from the polymer type, a polymer must fulfill at best all desired end properties and, additionally, must be easily processable. The main challenge in this regard is to increase the output while maintaining the good sealing properties of a film production line. While low $MFR_2$ values are beneficial for high sealing strengths, good mechanical properties and a wide temperature range of usage they limit the output of the film production line.

It is therefore the object of the present invention to provide a process for preparing polypropylene films providing a good balance of processability and mechanical properties. In particular, it is an object of the present invention to provide a process for preparing polypropylene films which enables the preparation of films with improved processability, i.e. the output of the film production line should be improved. It is a further object of the present invention, that the film production process provides sealing properties that are comparable or even better to those of comparable film production processes.

BRIEF DESCRIPTION OF THE DRAWINGS

FIG. 1 illustrates extruded pressure in function of take-up speed.

FIG. 2 illustrates seal strength in function of sealing temperature.

The foregoing and other objectives are solved by the subject-matter of the present invention. Advantageous embodiments of the present invention are defined in the corresponding sub-claims.

The finding of the present invention is that the output of a film production process is significantly improved while the sealing properties are maintained in case a polypropylene composition comprising a low amount of a high-$MFR_2$ polypropylene is utilized in the process. A further finding of the present invention is that the polypropylene composition used in the film production process must comprise a polypropylene with a melt flow rate $MFR_2$ (230° C.) in the range of 0.1 g/10 min to 30 g/10 min and additionally a small amount of a further polypropylene having a rather high melt flow rate $MFR_2$ (230° C.), i.e. of at least 250 g/10 min, like in the range of 250 g/10 min to 2200 g/10 min.

Accordingly the present invention is directed to a process for preparing polypropylene films comprising the following steps:
  a) providing a polypropylene composition (PP-C) comprising
    i) at least 90 wt.-% of a polypropylene (PP) having a melt flow rate according to ISO 1133 (230° C./2.16 kg) in the range of 0.1 g/10 min to 30 g/10 min and a comonomer content of up to 20 wt.-%, based on the total weight of the polypropylene (PP), the comonomers are selected from ethylene and/or $C_4$- to $C_{12}$ α-olefin, and
    ii) between 1 wt.-% and 10 wt.-% of a polypropylene (H-PP) having a melt flow rate according to ISO 1133 (230° C./2.16 kg) of at least 250 g/10 min, like in the range of 250 g/10 min to 2200 g/10 min, and a comonomer content of up to 5 wt.-%, based on the total weight of the polypropylene (H-PP), the comonomers are selected from ethylene and/or $C_4$- to $C_{12}$ α-olefin; and
  b) extruding the polypropylene composition (PP-C) of step a) to form a polypropylene film,
wherein the weight percentages under item a) are based on the total weight of the polypropylene composition (PP-C), more preferably are based on the total amount of polymers present in the polypropylene composition (PP-C), yet more preferably are based on the total amount of the polypropylene (PP) and the polypropylene (H-PP) together.

The inventors surprisingly found that the addition of a small amount of high MFR polypropylene (H-PP) significantly improves the output of a film production process while the sealing properties are maintained, i.e. the process according to the present invention especially allows the preparation of polypropylene films with higher output compared to film production processes utilizing polypropylenes which do not contain a high MFR polypropylene (H-PP).

Another aspect of the present invention is directed to a polypropylene film obtained by such a process. A further aspect of the present invention is directed to the use of such a polypropylene film as packaging material. A still further aspect is directed to an article comprising such a polypropylene film.

Another aspect of the present invention is directed to the use of a defined polypropylene composition (PP-C) to improve the processability of a film production process expressed by the extruder pressure during extrusion, wherein the improvement is defined by the Formula (I)

$$(PP)/(PP-C) \geq 1.1 \qquad (I)$$

wherein
(PP) is the extruder pressure [bar] of the polypropylene composition (PP-C) without the polypropylene (H-PP),
(PP-C) is the extruder pressure [bar] of the polypropylene composition (PP-C) comprising polypropylene (PP) and polypropylene (H-PP).

Yet another aspect of the present invention is directed to the use of a defined polypropylene (H-PP) being part of a polypropylene composition (PP-C) to improve the processability of a film production process expressed by the extruder pressure during extrusion, wherein the improvement is defined by the Formula (I)

$$(PP)/(PP-C) \geq 1.1 \qquad (I)$$

wherein
(PP) is the extruder pressure [bar] of the polypropylene composition (PP-C) without the polypropylene (H-PP),
(PP-C) is the extruder pressure [bar] of the polypropylene composition (PP-C) comprising polypropylene (PP) and polypropylene (H-PP).

When in the following reference is made to preferred embodiments or technical details of the process for preparing polypropylene films, it is to be understood that these preferred embodiments or technical details also refer to the inventive polypropylene film, the inventive use of the polypropylene film, the inventive article as well as the inventive use of a polypropylene composition or the inventive polypropylene (H-PP) to improve the processability of a film production process. If, for example, it is set out that the polypropylene (PP) of the utilized polypropylene composition (PP-C) preferably is a heterophasic propylene copolymer (HECO) and/or a random propylene copolymer (R-PP), also the polypropylene (PP) of the polypropylene composition (PP-C) provided in the inventive polypropylene film, the inventive use of the polypropylene film, the inventive article as well as the inventive use of the polypropylene composition (PP-C) to improve the processability of a film production process preferably is a heterophasic propylene copolymer (HECO) and/or a random propylene copolymer (R-PP).

According to one preferred embodiment of the present invention, the polypropylene (PP) has a) a melt flow rate according to ISO 1133 (230° C./2.16 kg) in the range of 0.5 g/10 min to 10 g/10 min, and/or b) a melting temperature Tm measured according to ISO 11357-3 of at least 150° C., and/or c) a xylene cold soluble content (XCS) measured according to ISO 6427 (23° C.) of more than 2.5 wt.-%, and/or d) a density measured according to ISO 1183-187 in the range of 860 kg/cm$^3$ to 940 kg/cm$^3$.

According to another preferred embodiment of the present invention, the polypropylene (PP) is a heterophasic propylene copolymer (HECO) and/or a random propylene copolymer (R-PP), preferably a heterophasic propylene copolymer (HECO).

According to yet another preferred embodiment of the present invention, the heterophasic propylene copolymer (HECO) comprises a) 50 wt.-% to 94 wt.-% of a matrix (M) being a random propylene copolymer (R-PP) or a propylene homopolymer (H-PP), and b) 6 wt.-% to 50 wt.-% of an elastomeric propylene-ethylene copolymer (EPC) having a comonomer content in the range of 2.5 wt.-% to 45 wt.-%, based on the total weight of the elastomeric propylene copolymer (EPC).

According to one preferred embodiment of the present invention, the random propylene copolymer (R-PP) has a comonomer content in the range of 1 wt.-% to 12 wt.-%, based on the total weight of the random propylene copolymer (R-PP) and the comonomers are ethylene.

According to another preferred embodiment of the present invention, the polypropylene (H-PP) has a) a melt flow rate according to ISO 1133 (230° C./2.16 kg) in the range of 250 g/10 min to 2200 g/10 min, like 500 g/10 min to 1700 g/10 min, and/or b) a melting temperature Tm measured according to ISO 11357-3 of at least 148° C., and/or c) a xylene cold soluble content (XCS) measured according to ISO 6427 (23° C.) of not more than 6.5 wt.-%.

According to yet another preferred embodiment of the present invention, the polypropylene (H-PP) is a propylene homopolymer (HH-PP) and/or a random propylene copolymer (RH-PP), preferably a propylene homopolymer (HH-PP).

According to one preferred embodiment of the present invention, the polypropylene composition (PP-C) comprises a) at least 95 wt.-%, of a heterophasic propylene copolymer (HECO), and b) between 1 wt.-% and 5 wt.-% of propylene homopolymer (HH-PP). wherein the weight percentages are based on the total weight of the polypropylene composition (PP-C), more preferably are based on the total amount of polymers present in the polypropylene composition (PP-C), yet more preferably are based on the total amount of the heterophasic propylene copolymer (HECO) and the propylene homopolymer (HH-PP) together.

According to another preferred embodiment of the present invention, the ratio of melt flow rate according to ISO 1133 (230° C./2.16 kg) between the polypropylene (H-PP) and polypropylene (PP) [MFR$_2$ (H-PP)/MFR$_2$ (PP)] in the polypropylene composition (PP-C) is at least 8 and more preferably at least 50, wherein "MFR$_2$ (H-PP)" is the MFR$_2$ (230° C.) of the polypropylene (H-PP) in the polypropylene composition (PP-C) and "MFR$_2$ (PP)" is the MFR$_2$ (230° C.) of the polypropylene (PP) in the polypropylene composition (PP-C).

According to yet another preferred embodiment of the present invention, the weight ratio between the polypropylene (PP) and polypropylene (H-PP) in the polypropylene composition (PP-C) [(PP)/(H-PP)] is at least 9/1 and most preferably at least 20/1, wherein "(PP)" is the amount of the polypropylene (PP) in the polypropylene composition (PP-C) and "(H-PP)" is the amount of the polypropylene (H-PP) in the polypropylene composition (PP-C).

According to another preferred embodiment of the present invention, the polypropylene film is a cast polypropylene film or an extrusion blown polypropylene film or a biaxially oriented polypropylene (BOPP) film.

In the following the invention is described in more detail.

The process according to this invention comprises at least two process steps a) and b). In process step a) the polypropylene composition (PP-C) is provided. Preferably, this step includes mixing the polypropylene (PP) with the polypropylene (H-PP). The mixing can be accomplished by known methods, like by dry blending or (melt) extrusion. In case of the (melt) extrusion the polypropylene composition (PP-C) is preferably subsequently pelletized. For mixing, a conventional compounding or blending apparatus, e.g. a Banbury mixer, a t-roll rubber mill, Buss-co-kneader or a twin screw extruder may be used. The polymer materials recovered from the extruder are usually in the form of pellets. After the mixing step a) the (pre)mix of the polypropylene (PP) and the polypropylene (H-PP), i.e. the polypropylene composition (PP-C), is used in step b), i.e. is fed into an extruder of the film making line. Accordingly essential aspect of the present invention is that the polypropylene (PP) and the polypropylene (H-PP) are not fed separately into the extruder but as an (intimate) mixture of the two components, i.e. as the polypropylene composition (PP-C). The step b) is defined in more detail below.

Especially good results are achievable in case the polypropylene composition (PP-C) comprises a high amount of a polypropylene (PP) having a melt flow rate according to ISO 1133 (230° C./2.16 kg) in the range of 0.1 g/10 min to 30 g/10 min, like 0.1 g/10 min to 20 g/10 min, and a small amount of a polypropylene (H-PP) having a melt flow rate according to ISO 1133 (230° C./2.16 kg) of at least 250 g/10 min, like of in the range of 500 g/10 min to 2000 g/10 min.

In particular, it is appreciated that the polypropylene composition (PP-C) provided in the instant process comprises
  i) at least 90 wt.-% of a polypropylene (PP) having a melt flow rate according to ISO 1133 (230° C./2.16 kg) in the range of 0.1 g/10 min to 30 g/10 min and a comonomer content of up to 20 wt.-%, based on the total weight of the polypropylene (PP), the comonomers are selected from ethylene and/or C$_4$- to C$_{12}$ α-olefin, and
  ii) between 1 wt.-% and 10 wt.-% of a polypropylene (H-PP) having a melt flow rate according to ISO 1133 (230° C./2.16 kg) of at least 250 g/10 min, like in the range of 500 g/10 min to 2000 g/10 min and a comonomer content of up to 5 wt.-%, based on the total weight of the polypropylene (H-PP), the comonomers are selected from ethylene and/or C$_4$- to C$_{12}$ α-olefin,
wherein the weight percentages of (PP) and (H-PP) are based on the total weight of the polypropylene composition (PP-C), more preferably are based on the total amount of polymers present in the polypropylene composition (PP-C), yet more preferably are based on the total amount of the polypropylene (PP) and the polypropylene (H-PP) together.

In one preferred embodiment of the present invention the weight ratio of the polypropylene (PP) and the polypropylene (H-PP) in the polypropylene composition (PP-C) is 9/1 to 60/1, more preferably 12/1 to 50/1, still more preferably 15/1 to 45/1, yet more preferably 20/1 to 45/1.

Accordingly, in one further preferred embodiment of the present invention, the polypropylene composition (PP-C) provided in the instant process comprises
  i) at least 93 wt.-% of polypropylene (PP), and
  ii) between 1 wt.-% and 7 wt.-% of polypropylene (H-PP),
wherein the weight percentages are based on the total weight of the polypropylene composition (PP-C), more preferably are based on the total amount of polymers present in the polypropylene composition (PP-C), yet more preferably are based on the total amount of the polypropylene (PP) and the polypropylene (H-PP) together.

For example, the polypropylene composition (PP-C) provided in the instant process comprises
  i) between 95 wt.-% and 99 wt.-% of polypropylene (PP), and
  ii) between 1 wt.-% and 5 wt.-% of polypropylene (H-PP),
wherein the weight percentages are based on the total weight of the polypropylene composition (PP-C), more preferably are based on the total amount of polymers present in the polypropylene composition (PP-C), yet more preferably are based on the total amount of the polypropylene (PP) and the polypropylene (H-PP) together.

The polypropylene composition (PP-C) provided in the process of the present invention may comprise further components. Accordingly the total amount of the polypropylene (PP) and the polypropylene (H-PP) together in the polypropylene composition (PP-C) is at least 60 wt.-%, more preferably at least 80 wt.-%, like 80 to 99 wt.-%, yet more preferably 90 to 100 wt.-%, based on the total amount of polymers present in the polypropylene composition (PP-C). In one specific embodiment the polypropylene composition (PP-C) comprises as polymer components only the polypropylenes (PP) and (H-PP) as defined in the instant invention. Accordingly, the amounts of polypropylenes, preferably the amount of (PP) and (H-PP) together, may not result in 100 wt.-% based on the total polypropylene composition (PP-C). Thus, the remaining part up to 100 wt.-% may be accomplished by further additives known in the art. However, this remaining part shall be not more than 3 wt.-%, like not more than 1.0 wt.-% within the total polypropylene composition (PP-C). For instance, the polypropylene composition (PP-C) of the present invention may comprise additionally small amounts of additives selected from the group consisting of antioxidants, stabilizers, fillers, colorants, nucleating agents and antistatic agents. In general, they are incorporated during granulation of the pulverulent products obtained in the polymerization. Accordingly, the polymers, more preferably the polypropylenes (PP) and (H-PP) together, constitute at least to 97 wt.-%, more preferably at least 99 wt.-% to the total polypropylene composition (PP-C). Primary and secondary antioxidants include, for example, hindered phenols, hindered amines, and phosphates. Nucleating agents include, for example, sodium benzoate, sorbitol derivatives like bis-(3,4-dimethylbenzylidene)sorbitol and nonitol derivatives like 1,2,3-trideoxy-4,6:5,7-bis-O[(4-propylphenyl)methylene]-nonitol. Other additives such as dispersing and antistatic agents like glycerol monostearate can also be included. Slip agents include, for example, oleamide and erucamide. Catalyst deactivators are also commonly used, for example, calcium stearate, hydrotalcite, and calcium oxide, and/or other acid neutralizers known in the art.

The polypropylene composition (PP-C) provided in step a) of the process of the present invention has a rather low melt flow rate. The melt flow rate mainly depends on the average molecular weight. This is due to the fact that long molecules render the material a lower flow tendency than short molecules. An increase in molecular weight means a decrease in the $MFR_2$-value. The melt flow rate ($MFR_2$) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.).

Accordingly, it is preferred that in the present invention the polypropylene composition (PP-C) has a melt flow rate $MFR_2$ (230° C./2.16 kg) of not more than 50 g/10 min, more preferably of not more than 20 g/10 min. In one preferred embodiment of the present invention, the polypropylene composition (PP-C) has a melt flow rate $MFR_2$ (230° C./2.16 kg) in the range of 0.1 g/10 min to 50 g/10 min, more preferably in the range of 0.5 g/10 min to 20 g/10 min and still more preferably in the range of 0.7 g/10 min to 15 g/10 min.

Furthermore, the polypropylene composition (PP-C) preferably comprises an elastomeric polymer component, like an ethylene propylene rubber. In other words, the polypropylene composition (PP-C) preferably comprises a heterophasic polypropylene composition, i.e. a system consisting of a polypropylene matrix in which an elastomeric phase is dispersed. Such systems are featured by a rather high xylene cold soluble content (XCS). Accordingly, the present polypropylene composition (PP-C) differs from a polypropylene composition (PP-C) which is free of such a heterophasic system by a rather high xylene cold soluble (XCS) content. Therefore, the polypropylene composition (PP-C) preferably has a xylene cold soluble fraction (XCS) of more than 5 wt.-%, more preferably more than 10 wt.-% and most preferably more than 12 wt.-%.

Regarding the upper limit of the xylene cold soluble fraction (XCS), it is appreciated that the polypropylene composition (PP-C) has a xylene cold soluble fraction (XCS) of below 50 wt.-%, more preferably in the range of 8 wt.-% to 50 wt.-%, more preferably in the range of 8 wt.-% to 35 wt.-%, yet more preferably in the range of 10 wt.-% to 25 wt.-%.

The inventive polypropylene composition (PP-C) is in particular further defined by its individual components.

One mandatory requirement is the presence of a polypropylene (PP) having a rather low melt flow rate $MFR_2$ (230° C.). Accordingly, the polypropylene composition (PP-C) shall comprise a polypropylene (PP) having a melt flow rate according to ISO 1133 (230° C./2.16 kg) in the range of 0.1 g/10 min to 30 g/10 min. Furthermore, the polypropylene (PP) is further defined by a comonomer content of up to 20 wt.-%, the comonomers are selected from ethylene and/or $C_4$- to $C_{12}$ α-olefin.

In one preferred embodiment of the present invention, the polypropylene (PP) is featured by a melt flow rate $MFR_2$ (230° C.) measured according to ISO 1133 in the range of 0.5 g/10 min to 30.0 g/10 min, more preferably in the range of 0.5 g/10 min to 20.0 g/10 min, yet more preferably in the range of 0.5 g/10 min to 10.0 g/10 min, still more preferably in the range of 0.5 g/10 min to 5.0 g/10 min. For example, the polypropylene (PP) has a melt flow rate $MFR_2$ (230° C.) measured according to ISO 1133 in the range of 0.5 g/10 min to 3.5 g/10 min.

In this context, it should be noted that the polypropylene (PP) is preferably featured by a medium molecular weight distribution (MWD). Accordingly, the polypropylene (PP) has a molecular weight distribution (MWD) measured by size exclusion chromatography (SEC) according to ISO 16014 of at least 2.0, more preferably at least 2.2, yet more preferably in the range of 2.0 to 6.0.

Additionally or alternatively, it is appreciated that the polypropylene (PP) is thermically stable, i.e. has a melting temperature Tm as determined by differential scanning calorimetry (DSC) of at least 150° C., more preferably of at least 155° C., like of at least 160° C. In one preferred embodiment of the present invention, the polypropylene (PP) has a melting temperature Tm as determined by differential scanning calorimetry (DSC) between 150° C. and 170° C., more preferably between 155° C. and 168° C. and most preferably between 158° C. and 165° C.

Additionally, it is preferred that the crystallization temperature of the polypropylene (PP) is at least 100° C., still more preferably in the range of 108° C. to 125° C.

The polypropylene (PP) can be a heterophasic propylene copolymer (HECO) and/or a random propylene copolymer (R-PP). Preferably, the polypropylene (PP) is a heterophasic propylene copolymer (HECO).

Accordingly the properties defined for the polypropylene (PP) above are also applicable for the specific embodiments thereof, namely the heterophasic propylene copolymer (HECO) and a random propylene copolymer (R-PP), if not otherwise indicated below.

A heterophasic propylene copolymer (HECO) according to this invention comprises a polypropylene (PP-M) as a matrix (M) and dispersed therein an elastomeric propylene copolymer (EPC). Thus, the polypropylene matrix (M) contains (finely) dispersed inclusions being not part of the matrix (M) and said inclusions contain the elastomeric propylene copolymer (EPC). The term "inclusion" according to this invention shall preferably indicate that the matrix and the inclusion form different phases within the heterophasic system, said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass trasition temperatures.

Preferably, the heterophasic propylene copolymer (HECO) according to this invention comprises as polymer components only the polypropylene (PP-M) and the elastomeric propylene copolymer (EPC). In other words the heterophasic propylene copolymer (HECO) may contain further additives but no other polymer in an amount exceeding 2 wt.-%, more preferably exceeding 1 wt.-%, like exceeding 0.5 wt.-%, based on the total heterophasic propylene copolymer (HECO). One additional polymer which may be present in such low amounts is a polyethylene which is a by-reaction product obtained by the preparation of the heterophasic propylene copolymer (HECO). Accordingly, it is in particular appreciated that the instant heterophasic propylene copolymer (HECO) contains only the polypropylene matrix (M), the elastomeric propylene copolymer (EPC) and optionally polyethylene in amounts as mentioned in this paragraph.

The heterophasic propylene copolymer (HECO) comprises apart from propylene also comonomers. Preferably the heterophasic propylene copolymer (HECO) comprises apart from propylene ethylene and/or $C_4$ to $C_{12}$ α-olefins. Accordingly the term "propylene copolymer" is understood as a polypropylene comprising, preferably consisting of, units derivable from
(a) propylene and
(b) ethylene and/or $C_4$ to $C_{12}$ α-olefins.

Thus, the heterophasic propylene copolymer (HECO), i.e. the matrix (M) and/or the elastomeric propylene copolymer (EPC), comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the heterophasic propylene copolymer (HECO) comprises, especially consists of, monomers copolymerizable with propylene from the group consisting of ethylene, 1-butene and 1-hexene. More specifically the heterophasic propylene copolymer (HECO) comprises—apart from propylene—units derivable from ethylene and/or 1-butene. In a preferred embodiment the heterophasic propylene copolymer (HECO) comprises units derivable from ethylene and propylene only. Still more preferably the matrix (M) as well as the elastomeric propylene copolymer (EPC) contain the same comonomers, like ethylene.

Accordingly, the elastomeric propylene copolymer (EPC) is preferably an ethylene propylene rubber (EPR), whereas the matrix (M) is either a random propylene copolymer (R-MPP) or a propylene homopolymer (H-MPP), the latter being preferred.

Additionally, it is appreciated that the heterophasic propylene copolymer (HECO) preferably has a comonomer content of below 20 wt.-%, more preferably in the range of 2.5 wt.-% to 20 wt.-%, more preferably in the range of 3 wt.-% to 18 wt.-%, yet more preferably in the range of 4 wt.-% to 15 wt.-%.

Thus, it is appreciated that the heterophasic propylene copolymer (HECO) comprises
 a) 50 wt.-% to 94 wt.-%, like 75 wt.-% to 92 wt.-%, based on the heterophasic propylene copolymer (HECO), of a matrix (M) being a random propylene copolymer (R-MPP) or a propylene homopolymer (H-MPP), and
 b) 6 wt.-% to 50 wt.-%, like 8 wt.-% to 25 wt.-%, based on the heterophasic propylene copolymer (HECO), of an elastomeric propylene-ethylene copolymer (EPC),
wherein the heterophasic propylene copolymer (HECO) has a comonomer content in the range of 2.5 wt.-% to 20.0 wt.-%, based on the total weight of the heterophasic propylene copolymer (HECO).

In one preferred embodiment of the present invention, the heterophasic propylene copolymer (HECO) comprises
 a) 50 wt.-% to 94 wt.-%, like 75 wt.-% to 92 wt.-%, based on the heterophasic propylene copolymer (HECO), of a matrix (M) being a random propylene copolymer (R-MPP) or a propylene homopolymer (H-MPP), and
 b) 6 wt.-% to 50 wt.-%, like 8 wt.-% to 25 wt.-%, based on the heterophasic propylene copolymer (HECO), of an elastomeric propylene-ethylene copolymer (EPC),
wherein the heterophasic propylene copolymer (HECO) has a comonomer content in the range of 3.0 wt.-% to 12.0 wt.-%, based on the total weight of the heterophasic propylene copolymer (HECO).

For example, the heterophasic propylene copolymer (HECO) comprises
 a) 50 wt.-% to 94 wt.-%, like 75 wt.-% to 92 wt.-%, based on the heterophasic propylene copolymer (HECO), of a matrix (M) being a random propylene copolymer (R-MPP) or a propylene homopolymer (H-MPP), and
 b) 6 wt.-% to 50 wt.-%, like 8 wt.-% to 25 wt.-%, based on the heterophasic propylene copolymer (HECO), of an elastomeric propylene-ethylene copolymer (EPC),
wherein the heterophasic propylene copolymer (HECO) has a comonomer content in the range of 3.5 wt.-% to 10.0 wt.-%, based on the total weight of the heterophasic propylene copolymer (HECO).

The heterophasic propylene copolymer (HECO) is in particular defined by the matrix (M) and the elastomeric propylene copolymer (EPC) dispersed therein. Accordingly both components are now defined in more detail.

The matrix (M) is a polypropylene (PP-M), more preferably a random propylene copolymer (R-MPP) or a propylene homopolymer (H-MPP), the latter especially preferred.

The expression propylene homopolymer as used throughout the instant invention relates to a polypropylene that consists substantially, i.e. of equal or below than 99.9 wt.-%, of propylene units. In a preferred embodiment only propylene units in the propylene homopolymer are detectable.

Thus, in case the matrix (M) is a propylene homopolymer (H-MPP) it preferably has a xylene cold soluble fraction of less than 6.5 wt.-%, more preferably in the range of 0.5 wt.-% to 6.5 wt.-%.

In case the polypropylene (PP-M) is a random propylene copolymer (R-MPP) it is appreciated that the random propylene copolymer (R-MPP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-MPP) according to this invention comprises, especially consists of, monomers copolymerizable with propylene from the group consisting of ethylene, 1-butene and 1-hexene. More specifically, the random propylene copolymer (R-MPP) of this invention comprises—apart from propylene—units derivable from ethylene and/or 1-butene. In a preferred embodiment the random propylene copolymer (R-MPP) comprises units derivable from ethylene and propylene only.

Additionally, it is appreciated that the random propylene copolymer (R-MPP) has preferably a comonomer content in the range of 0.5 wt.-% to 12.0 wt.-%, more preferably in the range of more than 1.0 wt-% to 9 wt.-%, yet more preferably in the range of 1.0 wt.-% to 5.0 wt.-%.

Thus, it is appreciated that the matrix (M) being a random propylene copolymer (R-MPP) has a xylene cold soluble fraction of less than 12 wt.-%, more preferably less than 9 wt.-%, even more preferably less than 8 wt.-%, like in the range of 1 wt.-% to 9 wt.-%.

The term "random" indicates that the comonomers of the propylene copolymer (R-MPP) are randomly distributed within the propylene copolymers. The term random is understood according to IUPAC (Glossary of basic terms in polymer science; IUPAC recommendations 1996).

As stated above, the polypropylene (PP) has a rather low melt flow rate. Accordingly, the same holds true for the matrix (M) of the heterophasic propylene copolymer (HECO), i.e. the polypropylene (PP-M). Thus, it is preferred that the polypropylene (PP-M) of the matrix (M) has a melt flow rate $MFR_2$ (230° C.) measured according to ISO 1133 in the range of 0.1 g/10 min to 30.0 g/10 min, more preferably of 0.5 g/10 min to 20.0 g/10 min, still more preferably in the range of 0.1 g/10.0 min to 10 g/10 min.

A further essential component of the heterophasic propylene copolymer (HECO) is the elastomeric propylene copolymer (EPC) dispersed in the matrix (M), i.e. in the polypropylene (PP-M). Concerning the comonomers used in the elastomeric propylene copolymer (EPC) it is referred to the information provided for the matrix (M) of the heterophasic propylene copolymer (HECO). Accordingly, the elastomeric propylene copolymer (EPC) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (EPC) comprises, especially consists of, monomers copolymerizable with propylene from the group consisting of ethylene, 1-butene and 1-hexene. More specifically the elastomeric propylene copolymer (EPC) comprises—apart from propylene—units derivable from ethylene and/or 1-butene. Thus, in an especially preferred embodiment the elastomeric propylene copolymer (EPC) comprises units derivable from ethylene and propylene only.

Accordingly, the elastomeric propylene copolymer (EPC) is preferably an elastomeric propylene-ethylene copolymer.

As used in the present invention, the term "elastomeric" corresponds to the commonly accepted meaning and refers to a rubber-like polymeric material of more or less amorphous nature.

The properties of the elastomeric propylene copolymer (EPC) mainly influence the xylene cold soluble (XCS) content of the heterophasic propylene copolymer (HECO). Thus according to the present invention the xylene cold soluble (XCS) fraction of heterophasic propylene copolymer (HECO) is regarded as the elastomeric propylene copolymer (EPC) of the heterophasic propylene copolymer (HECO). In the context of the present invention, the xylene cold soluble (XCS) fraction is also referred to as "amorphous fraction".

Accordingly, the amount of the elastomeric propylene copolymer (EPC), i.e. of the xylene cold soluble (XCS) fraction, of the heterophasic propylene copolymer (HECO) is preferably at least 8 wt.-%, more preferably is in the range of 8 to 50 wt.-%, still more preferably in the range of 9 to 35 wt.-%, like 10 to 25 wt.-%.

The comonomer content, preferably the ethylene content, within the elastomeric propylene copolymer (EPC) shall be preferably also in a specific range. Accordingly in a preferred embodiment the comonomer content, more preferably ethylene content, of the elastomeric propylene copolymer (EPC), i.e. of the xylene cold soluble fraction (XCS), of the heterophasic propylene copolymer (HECO), is equal or less than 50.0 wt.-%, more preferably in the range of 25.0 to 50.0 wt.-%. Accordingly it is appreciated that the propylene content of the elastomeric propylene copolymer (EPC), i.e. of the xylene cold soluble fraction (XCS), of the heterophasic propylene copolymer (HECO), is more than 50.0 wt.-%, more preferably in the range of more than 50.0 to 75.0 wt.-%.

Thus, it is appreciated that the xylene cold soluble fraction (XCS) of the heterophasic propylene copolymer (HECO) has an intrinsic viscosity (IV) measured according to ISO 1628-1 (at 135° C. in decalin) of equal or higher than 0.8 dl/g, more preferably of equal or higher than 1.0 dl/g, i.e. 1.2 dl/g, still more preferably in the range of 1.0 to 5.0 dl/g, i.e. 1.2 to 5.0 dl/g.

Polypropylenes (PP) suitable in the inventive polypropylene composition (PP-C) are available from a wide variety of commercial sources. Useful polypropylenes (PP) include the heterophasic propylene copolymer (HECO) available from Borealis AG, Vienna, Austria as BA110CF.

The elastomeric propylene copolymer (EPC) may be produced by known polymerisation processes such as solution, suspension and gas-phase polymerisation using conventional catalysts. Ziegler-Natta catalysts as well as metallocene catalysts are suitable catalysts.

Further information about the production of elastomeric propylene copolymer (EPC) is also provided in e.g. U.S. Pat. No. 3,300,459, U.S. Pat. No. 5,919,877, EP 0 060 090 A1 and in a company publication by EniChem "DUTRAL, Ethylene-Propylene Elastomers", pages 1-4 (1991).

If the elastomeric propylene copolymer (EPC) is prepared separately from the polypropylene (PP-M) constituting the matrix (M), it can be subsequently blended with the matrix polymer by any conventional blending means, e.g. melt blending in an extruder.

Alternatively, the elastomeric propylene copolymer (EPC) can be prepared as a reactor blend together with the polypropylene (PP-M) constituting the matrix (M), e.g. starting with the production of the matrix polymer in a loop reactor and transferring the product into a gas phase reactor, where the elastomeric copolymer is polymerised.

Preferably, the heterophasic propylene copolymer (HECO) is prepared by reactor blending in a multistep process comprising at least one loop reactor and at least one gas phase reactor.

Preferably, a dispersion of the elastomeric phase within the matrix polypropylene (PP-M) is produced by performing a second polymerization stage in the presence of particles of matrix polymer, e.g. as a second polymerization stage of a multistage polymerization. Preferably the combination of the matrix and elastomer copolymer is produced in a two stage polymerization using two or more polymerization reactors, more preferably using bulk and gas phase reactors (especially fluidized bed gas phase reactors), especially preferably using a loop reactor followed by two gas phase reactors or by a loop and a gas phase reactor. In such a procedure, the catalyst system used may be varied between stages but is preferably the same for all stages. Especially preferably, a prepolymerized heterogeneous catalyst is used.

The heterophasic propylene copolymer (HECO) according to this invention is preferably produced in a sequential polymerization process, i.e. in a multistage process, known in the art, wherein the polypropylene (PP-M) is produced at least in one slurry reactor, preferably in a slurry reactor and optionally in a subsequent gas phase reactor, and subsequently the elastomeric propylene copolymer (EPC) is produced at least in one, i.e. one or two, gas phase reactor(s).

The term "sequential polymerization process" indicates that the heterophasic propylene copolymer (HECO) is produced in at least two, like three or four reactors connected in series. Accordingly the present process comprises at least a first reactor (R1) and a second reactor (R2), or a first reactor (R1), a second reactor (R2), a third reactor (R3) and optionally a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least two, preferably two or three polymerization reactors, namely a slurry reactor (SR), like a loop reactor (LR), a first gas phase reactor (GPR-1) and optionally a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

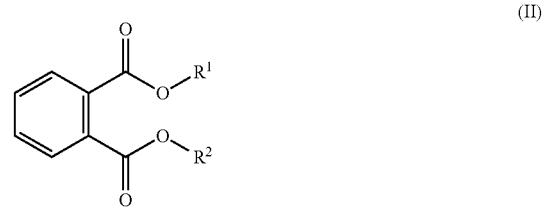

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of adding to said titanised carrier (i) a dialkylphthalate of formula (I) with $R^{1'}$ and $R^{2'}$ being independently at least a $C_5$-alkyl, like at least a $C_8$-alkyl, or preferably (ii) a dialkylphthalate of formula (I) with $R^{1'}$ and $R^{2'}$ being the same and being at least a $C_5$-alkyl, like at least a $C_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

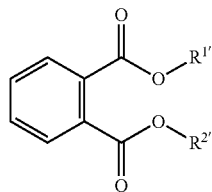

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the patent publications EP491566, EP591224 and EP586390, especially with the use of dioctylphthalate as dialkylphthalate of formula (I).

For the production of the heterophasic propylene copolymer (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminum, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \quad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \quad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIb) is diethylaminotriethoxysilane.

Most preferably the external donor is of formula (IIIa), like dicyclopentyl dimethoxy silane [Si(OCH$_3$)$_2$(cyclo-pentyl)$_2$] or diisopropyl dimethoxy silane [Si(OCH$_3$)$_2$(CH(CH$_3$)$_2$)$_2$].

In a further embodiment, the Ziegler-Natta procatalyst can be modified by polymerizing a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

In case the polypropylene (PP) being part of the polypropylene composition (PP-C) is a random propylene copolymer (R-PP), the random propylene copolymer (R-PP) preferably comprises, preferably consists of, units derived from (i) propylene and
(ii) ethylene and/or C$_4$ to C$_{12}$ α-olefin.

Accordingly the random propylene copolymer (R-PP) may comprise units derived from propylene, ethylene and/or α-olefin selected from the group consisting of C$_4$ α-olefin, C$_5$ α-olefin, C$_6$ α-olefin, C$_7$ α-olefin, C$_8$ α-olefin, C$_9$ α-olefin, C$_{10}$ α-olefin, C$_{11}$ α-olefin and C$_{12}$ α-olefin. More preferably, the random propylene copolymer (R-PP) comprises units derived from propylene, ethylene and/or α-olefin selected from the group consisting of 1-butene and 1-hexene are preferred. It is in particular preferred that the random propylene copolymer (RL-PP) consists of units derived from propylene and ethylene only.

Preferably, the units derivable from propylene constitutes the main part of the random propylene copolymer (R-PP), i.e. at least 88 wt.-%, preferably of at least 91 wt.-%, more preferably of at least 92 wt.-%, still more preferably of 88 wt.-% to 99 wt.-%, yet more preferably of 91 wt.-% to 99 wt.-% and most preferably of 92 wt.-% to 98.5 wt.-%, based on the total weight of the random propylene copolymer (R-PP).

The amount of units derived from ethylene and/or C$_4$ to C$_{12}$ α-olefins other than propylene in the random propylene copolymer (R-PP), is below 12 wt.-%, preferably in the range of 1 wt.-% to 12 wt.-%, more preferably 1 wt.-% to 9 wt.-% and most preferably 1.5 wt.-% to 8 wt.-%, based on the total weight of the random propylene copolymer (R-PP). It is in particular appreciated that the amount of ethylene in the random propylene copolymer (R-PP), in particular in case the random propylene copolymer (R-PP) comprises only units derivable from propylene and ethylene, is in the range of 1 wt.-% to 12 wt.-%, preferably in the range of 1 wt.-% to 9 wt.-% and most preferably in the range of 1.5 wt.-% to 8 wt.-%, based on the total weight of the random propylene copolymer (R-PP).

Further the units derived from ethylene and/or C$_4$ to C$_{12}$ α-olefin within the random propylene copolymer (R-PP) are randomly distributed. The randomness indicates the amount of isolated comonomer units, i.e. those which have no other comonomer units in the neighbourhood, compared to the total amount of comonomers in the polymer chain. In a preferred embodiment of the present invention, the randomness of the random propylene copolymer (R-PP) is at least 30%, more preferably at least 50%, even more preferably at least 60% and still more preferably at least 65%.

With respect to the production of the random propylene copolymer (R-PP) it is referred to the comments provided above with respect to the preparation of the polypropylene (PP-M) constituting the matrix (M).

As further mandatory component within the polypropylene composition (PP-C) the polypropylene (H-PP) must be present. Contrary to the polypropylene (PP) the polypropylene (H-PP) must have a rather high melt flow rate MFR$_2$ (230° C.). Accordingly, it is appreciated that the polypropylene (H-PP) has a melt flow rate MFR$_2$ (230° C.) measured according to ISO 1133 of at least 250 g/10 min, like in the range of 250 g/10 min to 2200 g/10 min, more preferably in the range of 500 g/10 min to 2000 g/10 min, yet more preferably in the range of 800 g/10 min to 1800 g/10 min, still more preferably in the range of 1000 g/10 min to 1400 g/10 min.

Especially good results are achievable if the ratio of the melt flow rate between the polypropylene (H-PP) and polypropylene (PP) [MFR$_2$ (H-PP)/MFR$_2$ (PP)] in the polypropylene composition (PP-C) is at least 8 and most preferably at least 50, wherein "MFR$_2$ (H-PP)" is the MFR$_2$ (230° C.) of the polypropylene (H-PP) and "MFR$_2$ (PP)" is the MFR$_2$ (230° C.) of the polypropylene (PP). Furthermore, the melt flow rates MFR$_2$ (230° C.) are measured according to ISO 1133. In one preferred embodiment of the present invention, the ratio of melt flow rate between the polypropylene (H-PP) and polypropylene (PP) [MFR$_2$ (H-PP)/MFR$_2$ (PP)] is in the range of 8 to 2000, more preferably in the range of 50 to 1750, most preferably in the range of 200 to 1750, wherein the melt flow rates MFR$_2$ (230° C.) are measured according to ISO 1133. For example, the ratio of melt flow rate between the polypropylene (H-PP) and the polypropylene (PP) [MFR$_2$ (H-PP)/MFR$_2$ (PP)] is in the range of 300 to 1750.

The polypropylene (H-PP) preferably has a xylene cold soluble content (XCS) measured according to ISO 6427 (23° C.) of not more than 6.5 wt.-%, more preferably not more than 6.0 wt.-%, yet more preferably in the range of 0.5 to 6.0 wt.-%.

Additionally or alternatively, the polypropylene (H-PP) has a melting temperature Tm measured according to ISO 11357-3 between 148° C. and 170° C., more preferably between 150° C. and 165° C. and most preferably between 152° C. and 164° C.

The molecular weight distribution (MWD) of the polypropylene (H-PP) can vary in a broad range. Preferably the molecular weight distribution (MWD) of the polypropylene (H-PP) measured by size exclusion chromatography (SEC) according to ISO 16014 is of not more than 6.0, more preferably in the range of 1.5 to 6.0.

The polypropylene (H-PP) is a propylene homopolymer (HH-PP) and/or a random propylene copolymer (RH-PP).

In one preferred embodiment, polypropylene (H-PP) is a propylene homopolymer (HH-PP).

Preferably the propylene homopolymer (HH-PP) has a melting temperature Tm measured according to ISO 11357-3 of at least 148° C., more preferably of at least 150° C. In one preferred embodiment, the propylene homopolymer (HH-PP) has a melting temperature Tm as determined by differential scanning calorimetry (DSC) between 148° C. and 165° C., more preferably between 150° C. and 163° C.

If the polypropylene (H-PP) is a random propylene copolymer (RH-PP), the random propylene copolymer (RH-PP) preferably comprises, preferably consists of, units derived from
(i) propylene and
(ii) ethylene and/or C$_4$ to C$_{10}$ α-olefin.

Accordingly the random propylene copolymer (RH-PP) may comprise units derived from propylene, ethylene and/or α-olefin selected from the group consisting of C$_4$ α-olefin, C$_5$ α-olefin, C$_6$ α-olefin, C$_7$ α-olefin, C$_8$ α-olefin, C$_9$ α-olefin and C$_{10}$ α-olefin. More preferably, the random propylene copolymer (RH-PP) comprises units derived from propylene, ethylene and/or α-olefin selected from the group consisting of 1-butene and 1-hexene are preferred. It is in particular preferred that the random propylene copolymer (RH-PP) consists of units derived from propylene and ethylene only.

Preferably, the units derivable from propylene constitutes the main part of the random propylene copolymer (RH-PP), i.e. at least 95 wt.-%, preferably of at least 97 wt.-%, more preferably of at least 98 wt.-%, still more preferably of 95 to 99.5 wt.-%, yet more preferably of 97 to 99.5 wt.-% and most preferably of 98 to 99.2 wt.-%, based on the total weight of the random propylene copolymer (RH-PP).

The amount of units derived from ethylene and/or C$_4$ to C$_{10}$ α-olefins other than propylene in the random propylene copolymer (RH-PP), is below 5 wt.-%, preferably in the range of 0.5 to 5 wt.-%, more preferably 0.5 to 3 wt.-% and most preferably 0.8 to 2 wt.-%, based on the total weight of the random propylene copolymer (RH-PP). It is in particular appreciated that the amount of ethylene in the random propylene copolymer (RH-PP), in particular in case the random propylene copolymer (RH-PP) comprises only units derivable from propylene and ethylene, is in the range of 0.5 to 5 wt.-% and preferably in the range of 0.8 to 2 wt.-%, based on the total weight of the random propylene copolymer (RH-PP).

Further the units derived from ethylene and/or C$_4$ to C$_{10}$ α-olefin within the random propylene copolymer (RH-PP) are randomly distributed. The randomness indicates the amount of isolated comonomer units, i.e. those which have no other comonomer units in the neighborhood, compared to the total amount of comonomers in the polymer chain. In a preferred embodiment, the randomness of the random propylene copolymer (RH-PP) is at least 30%, more preferably at least 50%, even more preferably at least 60% and still more preferably at least 65%.

Additionally, it is appreciated that the random propylene copolymer (RH-PP) has a melting temperature Tm measured according to ISO 11357-3 of at least 135° C., more preferably in the range of preferably from 135° C. to 162° C.

It is appreciated that a preferred polypropylene composition (PP-C) of the present invention preferably comprises a heterophasic propylene copolymer (HECO) and a propylene homopolymer (HH-PP).

It is thus appreciated that the polypropylene composition (PP-C) provided in the present process comprises
  a) at least 95 wt.-%, of a heterophasic propylene copolymer (HECO), and
  b) between 1 wt.-% and 10 wt.-%, like 1 wt.-% to 10 wt.-%, based on the total weight of the polypropylene composition (PP-C), of propylene homopolymer (HH-PP),
wherein the weight percentages are based on the total weight of the polypropylene composition (PP-C), more preferably are based on the total amount of polymers present in the polypropylene composition (PP-C), yet more preferably are based on the total amount of the polypropylene (PP) and the polypropylene (H-PP) together.

For example, the polypropylene composition (PP-C) provided in the present process comprises
  a) at least 96 wt.-%, based on the total weight of the polypropylene composition (PP-C), of a heterophasic propylene copolymer (HECO), and
  b) between 2 wt.-% and 5 wt.-%, based on the total weight of the polypropylene composition (PP-C), of propylene homopolymer (HH-PP),
wherein the weight percentages are based on the total weight of the polypropylene composition (PP-C), more preferably are based on the total amount of polymers present in the polypropylene composition (PP-C), yet more preferably are based on the total amount of the polypropylene (PP) and the polypropylene (H-PP) together.

In one preferred embodiment of the present invention, the polypropylene composition (PP-C) provided in the present process comprises
  a) a heterophasic propylene copolymer (HECO) having a melt flow rate according to ISO 1133 (230° C./2.16 kg) in the range of 0.1 g/10 min to 30 g/10 min, like 0.1 g/10 min to 20 g/10 min, and
  b) a polypropylene homopolymer (HH-PP) having a melt flow rate according to ISO 1133 (230° C./2.16 kg) of at least 250 g/10 min, like in the range of 300 g/10 min to 1600 g/10 min.

In this context, it is further appreciated that the weight ratio between the polypropylene (PP) and polypropylene (H-PP) in the polypropylene composition (PP-C) [(PP)/(H-PP)] is at least 9/1, i.e. 9/1 to 60/1, more preferably at least 12/1, like 12/1 to 50/1, yet more preferably at least 15/1, like 15/1 to 50/1, wherein "(PP)" is the amount of the polypropylene (PP) in the polypropylene composition (PP-C) and "(H-PP)" is the amount of the polypropylene (H-PP) in the polypropylene composition (PP-C).

In case the polypropylene composition (PP-C) comprises a heterophasic propylene copolymer (HECO) and a propylene homopolymer (HH-PP), the weight ratio between the heterophasic propylene copolymer (HECO) and the propylene homopolymer (HH-PP) in the polypropylene composition (PP-C) [(HECO)/(HH-PP)] is at least 10/1, like 10/1 to 60/1, more preferably at least 12/1, like 12/1 to 50/1, and yet more preferably of at least 20/1, like 20/1 to 45/1, wherein "(HECO)" is the amount of heterophasic propylene copolymer (HECO) in the polypropylene composition (PP-C) and "(HH-PP)" is the amount of the propylene homopolymer (HH-PP) in the polypropylene composition (PP-C).

The polypropylene which is produced according to the invention can be converted into polypropylene films, like cast polypropylene film or an extrusion blown polypropylene film or a biaxially oriented polypropylene (BOPP) film, by using conventional methods. Such methods typically comprise the use of at least one extruding process through a suitable die as is known in the art.

For example, in the cast film technology for producing polymer films, the molten polymer is extruded through a slot die fed by a (normally single-screw) extruder onto a first cooled roll, the so-called chill-roll. From this roll, the already solidified film is taken up by a second roll (nip roll or takeup roll) and transported to a winding device after trimming the edges.

The blown film technology for producing polymer films requires that the molten polymer is extruded through a tubular die fed by a (usually single-screw) extruder and blown up to a tube. The film tube is water cooled or air blown cooled, the latter preferred. The already solidified film tube is flattened afterwards by take-up rolls and taken off to a winder.

For the preparation of biaxially oriented PP films (BOPP), two main technologies are used for this process, which are described in detail in A. Ajji & M. M. Dumoulin, Biaxially oriented polypropylene (BOPP) process, in: J. Karger-Kocsis (Ed.) Polypropylene: An A-Z Reference, Kluwer, Dordrecht 1999, 60-67. Orientation and properties are determined by the draw ratio and details of the process; the films have generally the highest crystallinity and stiffness achievable.

Extruding devices suitable for the present process are discontinuous and continuous kneaders, twin screw extruders and single screw extruders with special mixing sections and co-kneaders. The residence time must be chosen such that a sufficiently high degree of homogenisation is achieved. Mixing is preferably achieved in that the polypropylene (PP) is mixed with the polypropylene (H-PP) which are obtained from a pulverulent product obtained in a polymerization process.

Furthermore, the present invention relates to the manufacture of extrusion coated substrates by conventional extrusion coating of the polypropylene composition (PP-C) as defined herein.

The extrusion coating process may be carried out using conventional extrusion coating techniques. Hence, the polypropylene composition (PP-C) as defined herein is fed, typically in the form of pellets, optionally containing additives, to an extruding device. From the extruder the polymer melt is passed preferably through a flat die to the substrate to be coated. Due to the distance between the die lip and the nip, the molten plastic is oxidized in the air for a short period, usually leading to an improved adhesion between the coating and the substrate. The coated substrate is cooled on a chill roll, after which it is passed to edge trimmers and wound up. The width of the line may vary between, for example, 500 to 1500 mm, e.g. 800 to 1100 mm, with a line speed of up to 1000 m/min, for instance 300 to 800 m/min. The temperature of the polymer melt is typically between 275 and 330° C. The polypropylene composition (PP-C) as defined herein of the invention can be extruded onto the substrate as a monolayer coating or as one layer in coextrusion. In either of these cases it is possible to use the polypropylene composition (PP-C) as defined herein as such or to blend the polypropylene composition (PP-C) with other polymers. Blending can occur in a post reactor treatment or just prior to the extrusion in the coating process. However it is preferred that only the polypropylene composition (PP-C) as defined in the present invention is extrusion coated. In a multilayer extrusion coating, the other layers may comprise any polymer resin having the desired properties and processability. Examples of such polymers include: barrier layer PA (polyamide) and ethylene-vinyl acetate (EVA); polar copolymers of ethylene, such as copolymers of ethylene and vinyl alcohol (EVOH) or copolymers of ethylene and an acrylate monomer; adhesive layers, e.g. ionomers, copolymers of ethylene and ethyl acrylate, etc; HDPE for stiffness; LDPE resins produced in a high-pressure process; LLDPE resins produced by polymerising ethylene and alpha-olefin comonomers in the presence of a Ziegler, chromium or metallocene catalyst; and MDPE resins.

Accordingly, a further requirement in this regard is that according to step b) of the present process, the polypropylene composition (PP-C) as defined above is extruded to form a polypropylene film.

The process of the present invention provides a good balance between processability and mechanical properties. In particular, the process of the present invention enables the preparation of polypropylene films with significantly improved output, while the sealing properties of the processes are maintained (see examples).

Thus, the present invention is preferably directed to the use of the instant polypropylene composition (PP-C) for the preparation of a polypropylene film, like a cast film, an extrusion blown film or a biaxially oriented polypropylene (BOPP) film. The polypropylene composition (PP-C) as defined above can be also used for the preparation of a coating of an extrusion coated substrate.

Preferably, said polypropylene film comprises at least 70 wt.-%, more preferably at least 90 wt.-%, like at least 95 wt.-%, of the polypropylene composition (PP-C) as defined above. In an especially preferred embodiment, the polypropylene film consists of the polypropylene composition (PP-C) as defined herein.

Accordingly, a further aspect of the present invention is directed to polypropylene films obtained by such a process. Furthermore, the present invention is also directed to the use of the inventive polypropylene film as packing material, in particular as a packing material for food and/or medical products. In addition thereto, the present invention is further directed to articles comprising said polypropylene film.

In view of the goods results achieved in the film production process with respect to the processability and mechanical properties by utilizing the inventive polypropylene composition (PP-C), a further aspect of the present invention refers to the use of the polypropylene composition (PP-C) as defined above to improve the processability of a film production process expressed by the extruder pressure during extrusion, wherein the improvement is defined by the Formula (I)

$$(PP)/(PP\text{-}C) \geq 1.1 \tag{I}$$

wherein (PP) is the extruder pressure [bar] of the polypropylene composition (PP-C) without the polypropylene (H-PP), (PP-C) is the extruder pressure [bar] of the polypropylene composition (PP-C) comprising polypropylene (PP) and polypropylene (H-PP).

In one preferred embodiment of the present invention, the processability of the film production process expressed by the extruder pressure during extrusion is improved, wherein the improvement is defined by the Formula (I)

$$(PP)/(PP-C) \geq 1.2 \qquad (I)$$

wherein (PP) is the extruder pressure [bar] of the polypropylene composition (PP-C) without the polypropylene (H-PP), (PP-C) is the extruder pressure [bar] of the polypropylene composition (PP-C) comprising polypropylene (PP) and polypropylene (H-PP).

In another preferred embodiment of the present invention, the processability of the film production process expressed by the extruder pressure during extrusion is improved, wherein the improvement is defined by the Formula (I)

$$(PP)/(PP-C) \approx 1.3 \qquad (I)$$

wherein (PP) is the extruder pressure [bar] of the polypropylene composition (PP-C) without the polypropylene (H-PP), (PP-C) is the extruder pressure [bar] of the polypropylene composition (PP-C) comprising polypropylene (PP) and polypropylene (H-PP).

The present invention will now be described in further detail by the examples provided below.

EXAMPLES

1. Definitions/Measuring Methods

The following definitions of terms and determination methods apply for the above general description of the invention as well as to the below examples unless otherwise defined.

Randomness

In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure -P-E-P- (one ethylene unit between propylene units), occurs at 733 cm$^{-1}$ This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C$^-$NMR. (Thermochimica Acta, 66 (1990) 53-68).

Randomness=random ethylene (-P-E-P-) content/the total ethylene content×100%.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

Density is measured according to ISO 1183-187. Sample preparation is done by compression molding in accordance with ISO 1872-2:2007

MFR$_2$ (230° C.) is measured according to ISO 1133 (230° C., 2.16 kg load).

Quantification of Comonomer Content by FTIR Spectroscopy

The comonomer content is determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 cm$^{-1}$. Propylene-1-butene-copolymers were evaluated at 767 cm$^{-1}$. Quantitative results are obtained based upon reference to the film thickness.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

The content of xylene cold solubles (XCS, wt.-%) was determined at 25° C. according ISO 16152; first edition; 2005 Jul. 1.

The intrinsic viscosity was measured according to DIN ISO 1628/1, October 1999 (in Decalin at 135° C.).

Sealing strength was measured by means of J&B 3000 Universal Sealer on 25.4 mm film strips. Sealing conditions: seal pressure: 0.1 N/mm$^2$, seal time: 0.1 s, cool time: 99 s.

Samples are sealed at increasing seal temperature and after cooling peeled at 10 mm/s.

Corresponding seal strength has been recorded.

2. Preparation of Examples

A) Compounds

All used polymers are commercially available by Borealis AG:

Polymer 1:

BA110CF is a heterophasic propylene-ethylene impact copolymer for cast and blown film extrusion with MFR$_2$ (230° C./2.16 kg) of 0.85 g/10 min, a melting temperature Tm of 166° C., an ethylene content of 8 wt.-%, XCS of 16.7 wt.-%, and a density of 910 kg/cm$^3$. The ethylene content of the XCS is 40 wt.-%.

Polymer 2:

HL512FB is a polypropylene homopolymer with MFR$_2$ (230° C./2.16 kg) of 1200 g/10 min and a melting temperature Tm of 166° C.

B) Examples

Inventive Example (1E)

A dry blend of 97 wt.-% polymer 1 and 3 wt.-% of polymer 2 was used. The amounts are based on the total weight of the composition. The blend has a MFR$_2$ of 1.8 g/10 min Comparative Example (CE)

Polymer 1 was used as comparative example.

C) Film Producing

The inventive example (1E) and comparative example (CE), respectively, were fed directly on the Reifenhäuser cast film pilot line at 270° C. to produce 70 μm monolayer polypropylene films.

At 270° C. the extruder pressure was determined at different take-up speeds. The maximum working pressure of the extruders is 300 bar. The data of the working pressure against take-up speed for the inventive example as well as for the comparative example are shown in FIG. 1.

From FIG. 1, it can be gathered that the comparative example could be produced at 20 m/min. At a take-up speed of 25 m/min, the working pressure in both extruders increased above the upper limit of the extruders, i.e. 300 bar. In contrast thereto, the addition of a low amount of a high-$MFR_2$ polypropylene resulted in a significantly improved processability. The inventive example could be run at a take-up speed of 30 m/min without exceeding 300 bar (pressure extruder A is 280 bar and pressure extruder B is 285 bar).

In addition thereto, the sealing properties of the inventive example and comparative example, respectively, were determined. The seal strength was plotted against the sealing temperatures for the respective inventive examples and comparative examples prepared at different take-up speeds as shown in FIG. 2.

From FIG. 2, it can be gathered that the seal strengths obtained for the inventive examples are comparable to those obtained for the comparative examples. Accordingly, it can be concluded that the addition of a low amount of a high-$MFR_2$ polypropylene hardly influences the sealing properties.

The invention claimed is:

1. Process for preparing polypropylene films comprising the following steps:
   a) providing a polypropylene composition (PP-C) comprising:
      i) at least 90 wt. %, based on the total weight of the polypropylene composition (PP-C), of a heterophasic propylene copolymer (HECO) having a melt flow rate according to ISO 1133 (230° C./2.16 kg) in the range of 0.1 g/10 min to 30 g/10 min and a comonomer content of up to 20 wt. %, based on the total weight of the heterophasic propylene copolymer (HECO), the comonomers are selected from ethylene and/or $C_4$- to $C_{12}$ α-olefin, and
      ii) between 1 wt. % and 10 wt. %, based on the total weight of the polypropylene composition (PP-C), of a polypropylene (H-PP) having a melt flow rate according to ISO 1133 (230° C./2.16 kg) of at least 250 g/10 min and a comonomer content of up to 5 wt. %, based on the total weight of the polypropylene (H-PP), the comonomers are selected from ethylene and/or $C_4$- to $C_{12}$ α-olefin; and
   b) extruding the polypropylene composition (PP-C) of step a) to form a polypropylene film;
      wherein the heterophasic propylene copolymer (HECO) comprises:
      a) 50 wt. % to 94 wt. % of a matrix (M) being a random propylene copolymer (R-PP) or a propylene homopolymer (H-PP), and
      b) 6 wt. % to 50 wt. % of an elastomeric propylene-ethylene copolymer (EPC) having a comonomer content in the range of 25 wt. % to 50 wt. %, based on the total weight of the elastomeric propylene copolymer.

2. The process according to claim 1, wherein the heterophasic propylene copolymer (HECO) has at least one of:
   a) a melt flow rate according to ISO 1133 (230° C./2.16 kg) in the range of 0.5 g/10 min to 10 g/10 min, or
   b) a melting temperature Tm measured according to ISO 11357-3 of at least 150° C., or
   c) a xylene cold soluble content (XCS) measured according to ISO 6427 (23° C.) of more than 2.5 wt. %, or
   d) a density measured according to ISO 1183-187 in the range of 860 kg/cm$^3$ to 940 kg/cm$^3$.

3. The process according to claim 1, wherein the polypropylene (H-PP) has at least one of:
   a) a melt flow rate according to ISO 1133 (230° C./2.16 kg) in the range of 500 g/10 min to 1700 g/10 min, or
   b) a melting temperature Tm measured according to ISO 11357-3 of at least 148° C., or
   c) a xylene cold soluble content (XCS) measured according to ISO 6427 (23° C.) of not more than 6.5 wt. %.

4. The process according to claim 3, wherein the polypropylene (H-PP) is a propylene homopolymer (HH-PP) and/or a random propylene copolymer (RH-PP).

5. The process according to claim 1, wherein the polypropylene composition (PP-C) comprises:
   a) at least 95 wt. %, based on the total weight of the polypropylene composition (PP-C), of a heterophasic propylene copolymer (HECO), and
   between 1 wt. % and 5 wt. %, based on the total weight of the polypropylene composition (PP-C), of a propylene homopolymer (HH-PP).

6. The process according to claim 1, wherein the ratio of melt flow rate according to ISO 1133 (230° C./2.16 kg) between the polypropylene (H-PP) and the heterophasic propylene copolymer (HECO) [$MFR_2$ (H-PP)/$MFR_2$ (HECO)] in the polypropylene composition (PP-C) is at least 8, wherein "$MFR_2$ (H-PP)" is the $MFR_2$ (230° C.) of the polypropylene (H-PP) in the polypropylene composition (PP-C) and "$MFR_2$ (HECO)" is the $MFR_2$ (230° C.) of the heterophasic propylene copolymer (HECO) in the polypropylene composition (PP-C).

7. The process according to claim 1, wherein the weight ratio between the heterophasic propylene copolymer (HECO) and polypropylene (H-PP) in the polypropylene composition (PP-C) [(HECO)/(H-PP)] is at least 9/1, wherein "(HECO)" is the amount of the heterophasic propylene copolymer (HECO) in the polypropylene composition (PP-C) and "(H-PP)" is the amount of the polypropylene (H-PP) in the polypropylene composition (PP-C).

8. The process according to claim 1, wherein the polypropylene film is a cast polypropylene film or an extrusion blown polypropylene film or a biaxially oriented polypropylene (BOPP) film.

9. Polypropylene film obtained by a process as defined in claim 1.

10. A polypropylene composition (PP-C) as defined in claim 1, to improve the processability of a film production process expressed by the extruder pressure during extrusion, wherein the improvement is defined by the Formula (I):

$$(HECO)/(PP-C) \geq 1.1 \qquad (I)$$

wherein
(HECO) is the extruder pressure [bar] of the polypropylene composition (PP-C) without the polypropylene (H-PP),
(PP-C) is the extruder pressure (bar) of the polypropylene composition (PP-C) comprising heterophasic propylene copolymer (HECO) and polypropylene (H-PP).

* * * * *